May 6, 1958
P. D. SANBORN
2,833,512
FAUCET ASSEMBLY
Filed Dec. 22, 1955
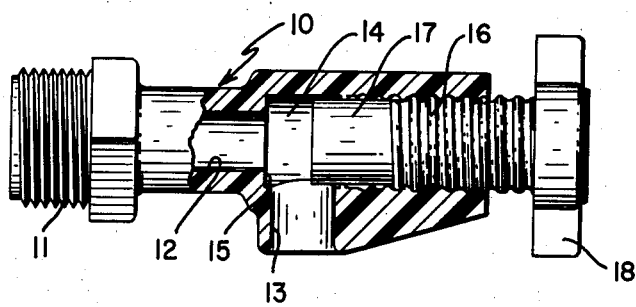
Fig. 1
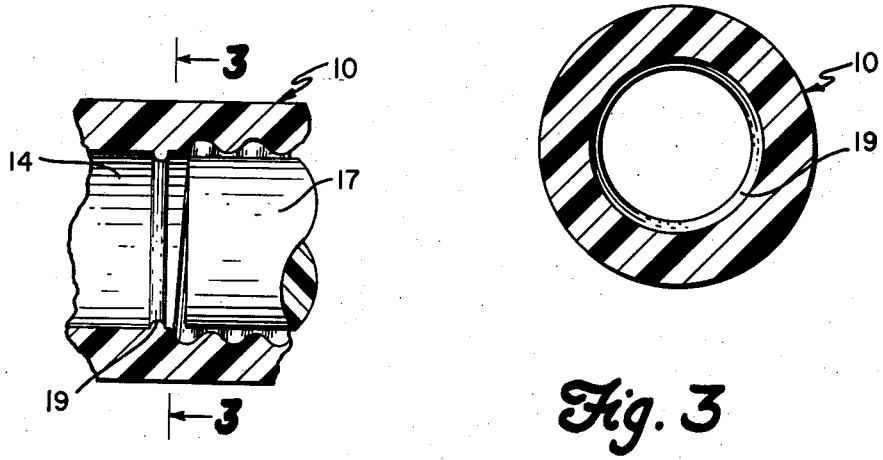
Fig. 2
Fig. 3
INVENTOR.
PHILLIP DONALD SANBORN
BY
ATTORNEY United States Patent Office 2,833,512
Patented May 6, 1958

2,833,512

FAUCET ASSEMBLY

Phillip Donald Sanborn, Chardon, Ohio, assignor, by mesne assignments, to National Laboratories, Inc., a corporation of Delaware Application December 22, 1955, Serial No. 554,856

1 Claim. (Cl. 251—214)

This invention relates to faucets but more particularly to faucets for dispensing liquid chemicals from drums, and an object is to produce a new and improved faucet assembly which is simple and inexpensive to produce and has a device for preventing leakage between the valve part and the casing part, such device being integral with one of the parts and being adapted intimately to impinge against the other part, so that in spite of relative axial movement between these parts a liquid-tight seal is maintained at all times.

Other objects and advantages will hereinafter appear, and for purposes of illustration but not of limitation, an embodiment of the invention is shown on the accompanying drawings in which—

Figure 1 is a view partly in elevation and partly in longitudinal section of a faucet assembly;

Figure 2 is an enlarged fragmentary view of the faucet casing in longitudinal section and the screw valve therein in elevation to show the sealing device between these parts; and Figure 3 is a transverse sectional view on the line 3—3 of Figure 2 with the valve removed.

The illustrated embodiment of the invention comprises a faucet assembly including a housing part 10 having a screw-threaded nipple 11 for engagement with a threaded hole in a drum containing liquid chemical. The housing has a longitudinal passage 12 for flow of liquid from the nipple 11 and discharge spout or nozzle 13 disposed at right angles to the longitudinal passage. The nozzle extends from a valve chamber 14 which is somewhat larger in diameter than the passage 12, a square shoulder 15 at one side of the nozzle providing a stop for the flat end of the screw valve.

At the right of the nozzle 13 the valve chamber has an open end passage, the walls of which are interiorly screw-threaded to receive the external threads on the plug valve 16 which has a nose 17, the external surface of which is cylindrical and smooth. The diameter of the nose 17 is slightly less than the diameter of the valve chamber 14. On the outer end of the valve 16 is a handle 18 to enable manual operation.

Formed on the wall of the valve chamber on the side of the spout 13 toward the screw threads and juxtaposed to the spout is an internal annular rib 19 which, as shown in Figure 2, is rounded in cross section. The annular rib 19 provides a constriction in the valve chamber and the diameter of the valve chamber in this region is somewhat greater than the diameter of the smooth nose 17 of the valve, thereby imposing a constricting impingement on the surface of the nose as the valve is shifted longitudinally.

In this instance both the housing and valve are of resilient plastic material, such as polyethylene, which enables the annular rib 19 to embed itself into the valve nose 17 to a slight extent. There is sufficient resiliency in the material so that when the valve 16 shifts, the annular rib does not prevent such movement but at all times presses against the nose so that liquid does not seep along the threads to the outside. The inherent nature of the material is such that this device is effective in preventing leakage of liquid along the threaded barrel of the housing.

If desired, the housing or the valve may be of a material other than resilient polyethylene, but in such case it is important that the other part be of a resilient plastic material in order to effect the liquid tight seal between the valve and housing.

Numerous changes in details of construction and choice of materials may be effected without departing from the spirit of the invention, especially as defined in the appended claim.

What I claim is:

A faucet assembly comprising an elongate housing member having a hollow cylindrical bore extending from end-to-end therethrough, said bore having a relatively large diameter portion extending for part of its length from one end thereof and terminating at its inner end at an inwardly projecting shoulder constituting a valve seat, the remainder of said bore being of relatively small diameter, threads running for part of the length of the large diameter portion of the bore adjacent said one end, the part of said large diameter portion between said threads and said shoulder constituting a valve chamber, a lateral spout on said housing member, said spout having a spout passage with an inner end terminating in the valve chamber adjacent the seat, a plug valve having a cylindrical head member slidingly engaged in said valve chamber, the outer diameter of said head member being but slightly less than the inner diameter of the large portion of the bore which constitutes the valve chamber and being of a length to engage the seat while bridging the inner end of the spout passage, said plug valve having a stem extending from the head member through the large diameter portion of the bore to the exterior of said housing member, threads on said stem engaging the internal threads on said bore, a handle on the outer end of said stem, an attaching nipple on that end of said housing part surrounding the small diameter portion of the bore, and an annular rib integral with said housing member, said rib being rounded in cross-section and projecting inwardly into the valve chamber adjacent the inner end of the spout passage and on the side thereof nearest the internal threads, said housing member and said valve head being of resilient polyethylene plastic, said rib being of only slightly less inner diameter than the diameter of said head and constrictingly engaging a portion of the same, the rib and that portion of the head constrictingly engaged thereby being mutually deformable and of a plasticity such that the rib is partially embedded in the engaged portion of the head.

References Cited in the file of this patent

UNITED STATES PATENTS

| 2,617,171 | Kimmel | Nov. 11, 1952 |
| 2,661,019 | Snyder | Dec. 1, 1953 |

FOREIGN PATENTS

| 210,530 | Great Britain | of 1924 |
| 362,953 | Great Britain | of 1931 |
| 720,211 | Great Britain | of 1954 |